US009723653B2

(12) United States Patent
Shikowitz

(10) Patent No.: US 9,723,653 B2
(45) Date of Patent: Aug. 1, 2017

(54) INTELLIGENT HETEROGENEOUS, MOBILE, AD-HOC COMMUNICATION NETWORK

(71) Applicant: Penny Shikowitz, Durham, NC (US)

(72) Inventor: Penny Shikowitz, Durham, NC (US)

(73) Assignee: On Track Technologies Incorporated, Durham, NC (US)

( * ) Notice: Subject to any disclaimer, the term of this patent is extended or adjusted under 35 U.S.C. 154(b) by 414 days.

(21) Appl. No.: 14/467,913

(22) Filed: Aug. 25, 2014

(65) Prior Publication Data

US 2014/0362848 A1    Dec. 11, 2014

Related U.S. Application Data

(63) Continuation of application No. 12/263,467, filed on Nov. 1, 2008, now Pat. No. 8,818,397.

(60) Provisional application No. 60/984,456, filed on Nov. 1, 2007, provisional application No. 60/984,494, filed on Nov. 1, 2007, provisional application No. 60/984,486, filed on Nov. 1, 2007, provisional application No. 60/984,462, filed on Nov. 1, 2007.

(51) Int. Cl.
*H04W 84/18* (2009.01)
*H04W 4/02* (2009.01)
*G01D 21/00* (2006.01)
*H04L 29/08* (2006.01)

(52) U.S. Cl.
CPC ............ *H04W 84/18* (2013.01); *G01D 21/00* (2013.01); *H04L 67/12* (2013.01); *H04W 4/02* (2013.01); *H04L 67/125* (2013.01)

(58) Field of Classification Search
CPC ........ G01D 21/00; H04L 67/12; H04L 67/125
See application file for complete search history.

(56) References Cited

U.S. PATENT DOCUMENTS

| | | | | |
|---|---|---|---|---|
| 6,067,290 A * | 5/2000 | Paulraj | ................. | H04B 7/0613 370/329 |
| 2003/0152041 A1* | 8/2003 | Herrmann | ............... | H04L 12/12 370/310 |
| 2005/0208949 A1* | 9/2005 | Chiueh | ................. | H04L 45/125 455/452.2 |
| 2008/0253327 A1* | 10/2008 | Kohvakka | ............. | H04W 16/14 370/330 |

* cited by examiner

*Primary Examiner* — Kashif Siddiqui
(74) *Attorney, Agent, or Firm* — Meunier Carlin & Curfman LLC

(57) ABSTRACT

The present invention relates to a Mobile Ad Hoc Network that possesses sufficient intelligence to handle a collection of devices that differ in terms of features either inherent to the device or the environment in which they operate. The different features inherent to the device may consist of different hardware and software technologies (e.g., combination of RF for transmission ability, processing ability, power supply, and interfaces). The different features of the environment may consist of any telemetry data measuring the state of the environment, as well as information regarding the MANet such as the density of devices in the vicinity of a device. Various applications are considered.

9 Claims, 7 Drawing Sheets

TRACKING DEVICE

INTELLIGENT HETEROGENEOUS, MOBILE, AD-HOC COMMUNICATION NETWORK

CROSS-REFERENCE TO PRIORITY APPLICATIONS

This application is a continuation of commonly assigned U.S. patent application Ser. No. 12/263,467 for Intelligent Heterogeneous, Mobile, Ad-Hoc Communication Network (filed Nov. 1, 2008, and published Sep. 27, 2009, as U.S. Patent Application Publication No. 2009/0238087 A1). Each of U.S. patent application Ser. No. 12/263,467 and U.S. Patent Application Publication No. 2009/0238087 A1 is hereby incorporated by reference in its entirety.

U.S. patent application Ser. No. 12/263,467 claims the benefit of commonly assigned U.S. Patent Application No. 60/984,456 for "Intelligent Heterogeneous, Mobile, Ad-Hoc Communication Network" (filed Nov. 1, 2007).

U.S. patent application Ser. No. 12/263,467 further claims the benefit of commonly assigned U.S. Patent Application No. 60/984,494 for "Triple Mode Redundant Communication Device" (filed Nov. 1, 2007).

U.S. patent application Ser. No. 12/263,467 further claims the benefit of commonly assigned U.S. Patent Application No. 60/984,486 for "Flexible Communication Device for Animal Collars" (filed Nov. 1, 2007).

U.S. patent application Ser. No. 12/263,467 further claims the benefit of commonly assigned U.S. Patent Application No. 60/984,462 for "Communication Device for Residential Telemetry" (filed Nov. 1, 2007).

TECHNICAL FIELD

The present invention relates to a Mobile Ad Hoc Network that possesses sufficient intelligence to handle a collection of devices that differ in terms of features either inherent to the device or the environment in which they operate.

BACKGROUND OF THE INVENTION

Mobile Ad-Hoc Networks permit geographically dispersed devices to form a communication network in which one device in the network typically sends data to another device in the network through other devices in the network that form an ad hoc wireless or wired communication bridge. Various routing algorithms have been invented to efficiently construct a communication bridge so that one device in a network can send data to another device in the network, potentially a great distance away.

Some routing algorithms take advantage of limited heterogeneous characteristics of the devices in the network (such as power supply), and some algorithms possess intelligence to adapt the routing instruction based on certain characteristics of the environment.

Mobile Ad Hoc Networks are finding use in a variety of applications, such as in disaster recovery/monitoring in areas in which the pre-existing communication infrastructure may have been destroyed, personal area networks that eliminate the need for wires, and maintaining non-line-of-sight communication in remote areas.

As mobile communication devices become more powerful and common, there is a need for a Mobile Ad Hoc Network that possesses a high degree of intelligence to efficiently monitor the status of a great number of mobile communication devices that differ along a wide variety of dimensions that are either inherent to the device or reflect the environment within which the device is located.

The present invention develops a Mobile Ad Hoc Network and Monitoring Center with the intelligence to efficiently handle the communication needs of a highly sophisticated collection of heterogeneous mobile communication devices.

SUMMARY OF THE INVENTION

The present invention contemplates a variety of mobile communication devices that potentially differ according to a wide variety of characteristics. Examples of these characteristics include:

Physical characteristics of a device, such as power supply, imbedded circuits, size, ability to accept data input or provide output, amount of memory Capabilities, including modes of communication (examples include cellular such as CDMA and GSM, Satellite, Wi-Fi, and other RF to support a Mobile Ad Hoc Network), ranges of communication Current state, including whether communication is established with other specific nodes, current algorithms for decision making, current data cached Current network role, possible network roles the device is capable of accepting Location Association with specific data sources State of immediate environment, including physical aspects such as temperature, network aspects such as current traffic load, strategic and tactical aspects such as likelihood of detection, etc.

The invention describes one or more Monitoring Centers and their ability to monitor and control a collection of devices with varying capabilities in an intelligent manner. Examples of such intelligence include:

Without human intervention, instruct devices to use specific algorithms for deciding priorities among messages to transmit and among paths to send messages Regulate Network status and send instructions to various devices to alter their role in the network The invention describes a Network with various characteristics to efficiently route information for various purposes through a collection of devices with varying capabilities. Example of Network characteristics include:

A hierarchy in which different nodes have different communication ability, and some devices are instructed to send data to the closest device with a prescribed communication capability With a large number of nodes, a hierarchy that creates super nodes, super super nodes, etc., to which manage communication for sub-network layers under them Messages are assigned different priorities based on various features, such content, age of message, originating node, message direction Nodes may differ in terms of a description (such as a set of characteristics) of which other nodes it can communicate with

DETAILED DESCRIPTION OF THE INVENTION

Provisional Number 1

Figure 1:
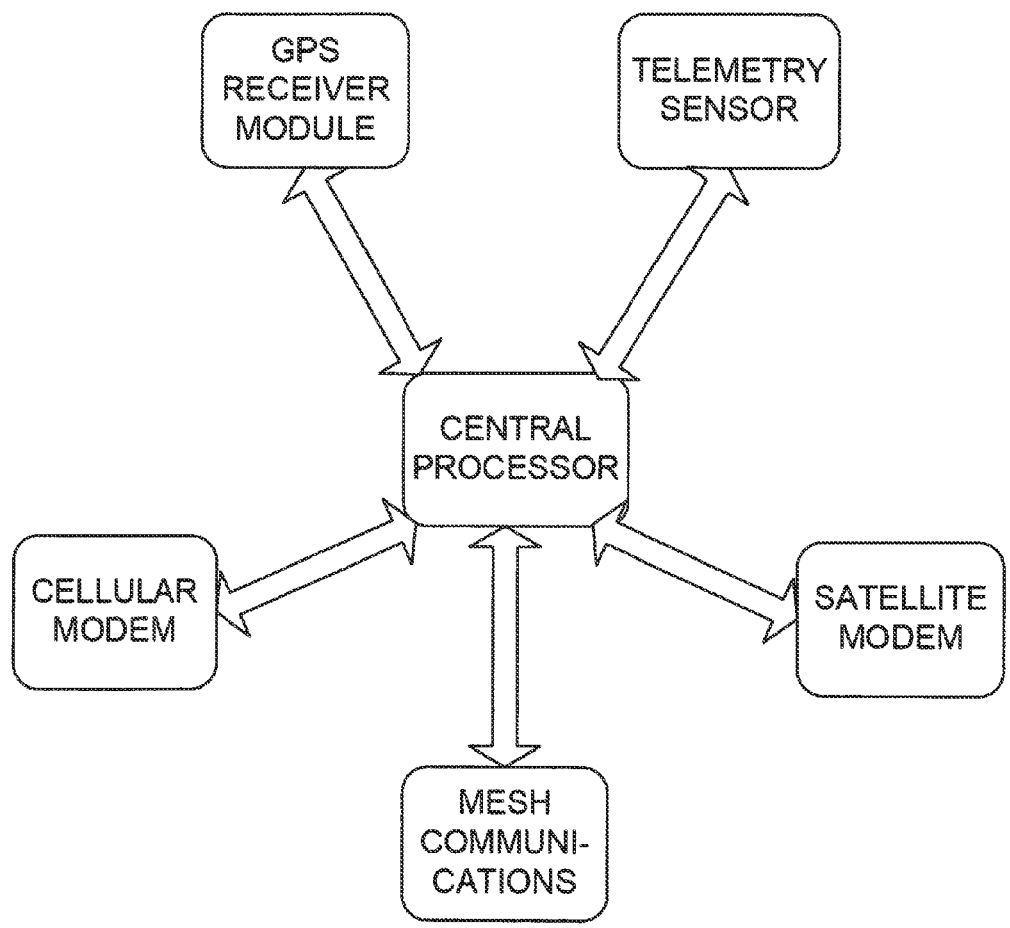
FIG. 1 is an illustration of a multi-functional device that can be used with the invention.
Figure 2:
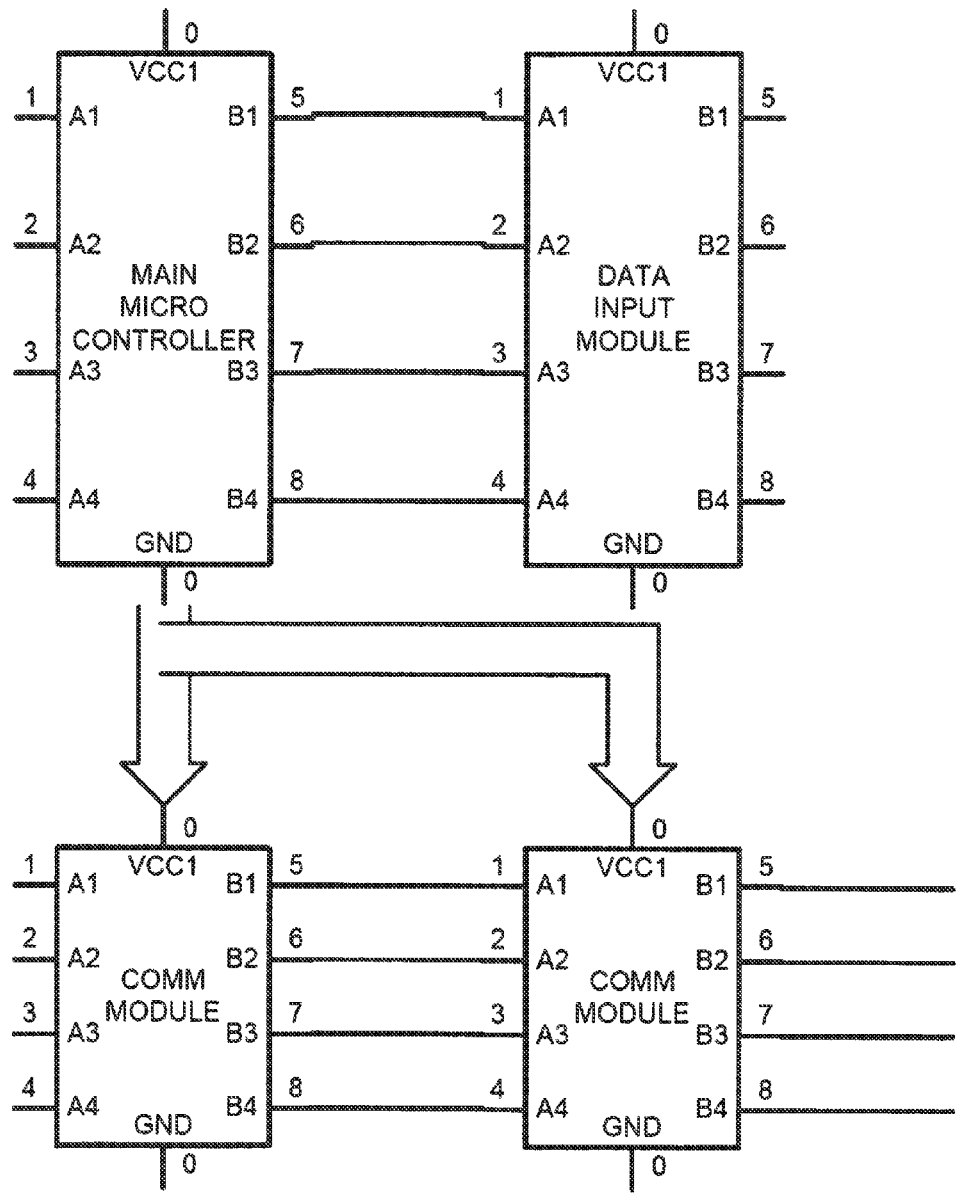
FIG. 2 is a block diagram showing components within an individual device.

The present invention encompasses an overall communication network and components thereof that allows one or more monitoring centers to maintain real time (or near-real time) awareness of the locations and/or other situational status of geographically (or logically) dispersed devices. The monitoring center(s) can issue instructions to the devices to control the acquisition and transmission of data back to the monitoring center(s). The interaction among the devices and the network(s) is very robust in that multiple radio frequency (RF) communication protocols can be utilized to achieve an unparalleled geographic diversity that allows devices virtually anywhere in the world to get and stay connected to the network.

The system described herein includes one or more networks, one or more devices coupled with the one or more networks, and one or more monitoring centers for sending and receiving data to and from individual devices. Each of the components will be more thoroughly discussed throughout this disclosure both separately and in combination with one another. Several illustrative examples will be described to highlight the capabilities of the devices and system that comprise the invention.

Prior to discussing the specifics of the invention, it is helpful to provide a glossary-like description of some terminology that will be used throughout this disclosure.

| Term | Definition |
| --- | --- |
| Mesh Network | A mesh network is a communication network in which each node is potentially able to communicate directly with every other node in the network, and in which messages are relayed from node to node as they propagate from source to destination. Typically messages traverse multiple random paths through the network. A mesh network may be complete, in which case each node is in direct communication with every other node, or may be incomplete, in which case communication between some pairs of nodes is only possible through messages that traverse one or more intervening nodes. |
| MANet | MANet is short for mobile ad-hoc network. A MANet is a communication network in which nodes may move (potentially causing them to lose direct communication with some nodes and to gain direct communication with other nodes previously not within direct communication range), in which nodes may enter or leave the network with passing time, and in which the set of direct connections between pairs of nodes changes over time. A mobile ad-hoc network shares with the mesh network the characteristic that each node may potentially communicate directly with every other node. |
| GPS | Global Positioning System (GPS) is the capability to use signals from the system of US Government GPS orbiting satellites to establish location in three dimensions through trilateration. For devices in service in the civilian sector, GPS includes the Standard Position Service (SPS) offered through the GPS satellites and, potentially, assisted or augmented GPS (uses additional data to increase precision and accuracy of location). For military and some other Government service, GPS typically includes Precise Position Service (PPS) capability, which utilizes additional information sent by the satellites along with the SAASM cryptography architecture for determining location. |
| RFID | Radio frequency identification (RFID) is a system in which radio-transmitting tags are attached to items of value in order to facilitate identification. A tag is read by a scanner, which transmits a radio signal to the tag requesting that the tag transmit back identification information. The tags may be "active" in which case they have their own power supply (typically a battery) or "passive" in which case the tags absorb energy from the radio signal sent by the scanner and use this energy to transmit theit identification information, Typically, tags must be in close proximity to the scanner in order to be read—within a few meters for active tags, within a few millimeters for passive devices. |
| TTL | A tag, track, and locate (TTL) system is a system for attaching a tag to items or people and then tracking the tags (and attached items or people) or locating the tags (and items or people) at a later time. TTL systems may be used for covert surveillance or for reconnaissance, or may be used in logistics operations to track inventory in transit and to locate inventory items in warehouses or supply dumps. |

-continued

| Term | Definition |
| --- | --- |
| Geo-Fencing | Geo-fencing is the definition, of geographic boundaries for a device, Typically, crossing a geo-fence boundary triggers some action by a device. |
| Communications network: | A network of communications links and nodes arranged so that messages may be passed from one part of the network to another over multiple links and through various nodes. Communications network links may consist of hierarchical sub networks. |
| Command-data Communication | Communications from the control center to remote devices to change operational conditions comprising reporting time, output power, method of transmission, text display, opto-electric indicators, audio indicators, and geo-fencing values. |
| Satellite Phone Communications | Communications, either voice or data passed to/from a modem or handset to an orbiting satellite as part of the satellite phone networks. |
| Satellite Phone Network | Instead of terrestrial a network for mobile phones and data transceivers that connects to orbiting satellites cell sites. Depending on the architecture of a particular system, coverage may include the entire Earth, or only specific regions. |
| Backhaul | In a hierarchical communication network this portion of the network comprises the intermediate links between the core, or backbone, of the network and the small sub networks at the "edge" of the entire hierarchical network. For example, while remote devices may communicate with one another, constituting a local sub network, a connection, such as cellular or satellite, between the local sub network and the rest of the world begins with a backhaul link to the core of the cellular or satellite network. |
| Situational Status Information: | Telemetry data comprising information from a local node or device, such as temperature, vibration, shock, fuel levels, engine temperature, oil levels, oil temperature, human or animal heart rate, location from inertial devices, chemical detection, etc. Also included are settings within the device itself, comprising current algorithms for decision making, current data cache rules current rules for communicating with other devices, along with history data or recent communications. |
| FHSS communication | Frequency-hopping spread spectrum (FHSS) is a method of transmitting radio signals by rapidly switching a carrier among many frequency channels of a given band, using a sequence known to both transmitter and receiver. |

FIG. 1 is an illustration of a generic multi-functional device that can be used with the invention. A multi-functional device can possess various characteristics. At its essence, it is capable of transmitting and receiving data using one or more radio frequency (RF) communication modes, including but not limited to, multiple cellular modes, WiFi, Wi Max, and satellite. It should be noted that a device can also be hard-wired or infrared linked to a network if the circumstances surrounding the deployment of a device allow.

Since the primary purpose of a multi-functional device is to send and receive data, if follows that the device can include additional intelligence in the form of hardware, software, and embedded circuitry to support the primary purpose. A digital signal processor can serve to coordinate incoming and outgoing data to the device as well as execute software application(s) that process data and control the various RF modules that send and receive the data.

A device can include multiple RF modules such as, for instance, RF cellular modules such as a global system for mobile communications (GSM) module or a code division multiple access (CDMA) module, a satellite communications module, and a WiFi/WiMax module. Each of these modules can operate independently of one another so as to provide RF communications ability virtually anywhere the module happens to be deployed. Not every device need be equipped with a full complement of RF modules, however, to create a network of devices that can communicate with a remotely located central monitoring station.

In addition to RF communications, a device can include one or more sensors designed to gather data pertaining to the local environment. A non-exhaustive list of sensors can include temperature sensors, microphones, location determination mechanisms (e.g., a GPS receiver). The sensors operate to gather data to be locally processed by the device via the digital signal processor. The data can then be forwarded to a monitoring center for further analysis and action.

A power supply can power one or more components within the device or individual components can have their own power supplies. The devices can be self powered (e.g., batteries, solar cells) or receive power from an external source if the deployment of the device allows.

Figure 3A:
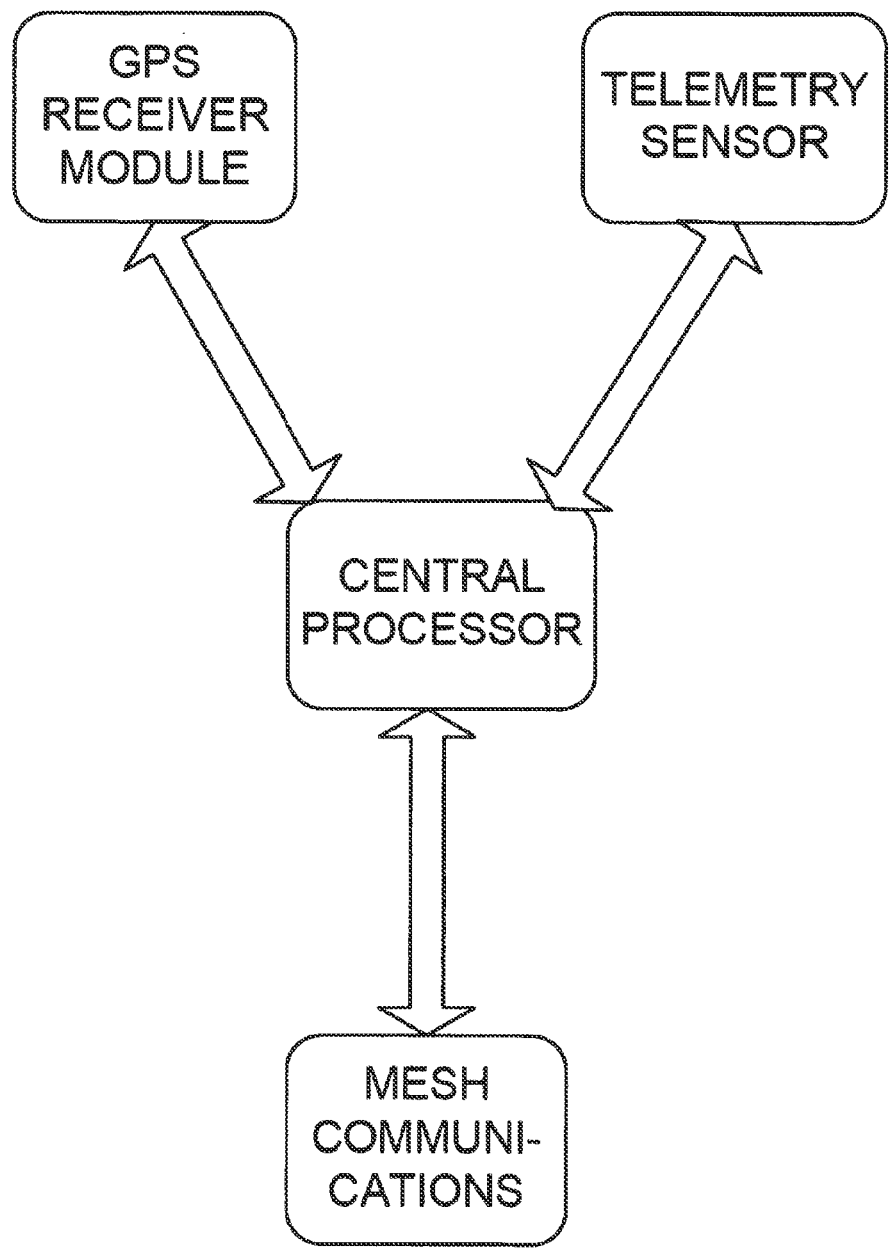
FIGS. 3a-3b illustrate types of devices that can be dispersed throughout a MANet invention.
Figure 3B:
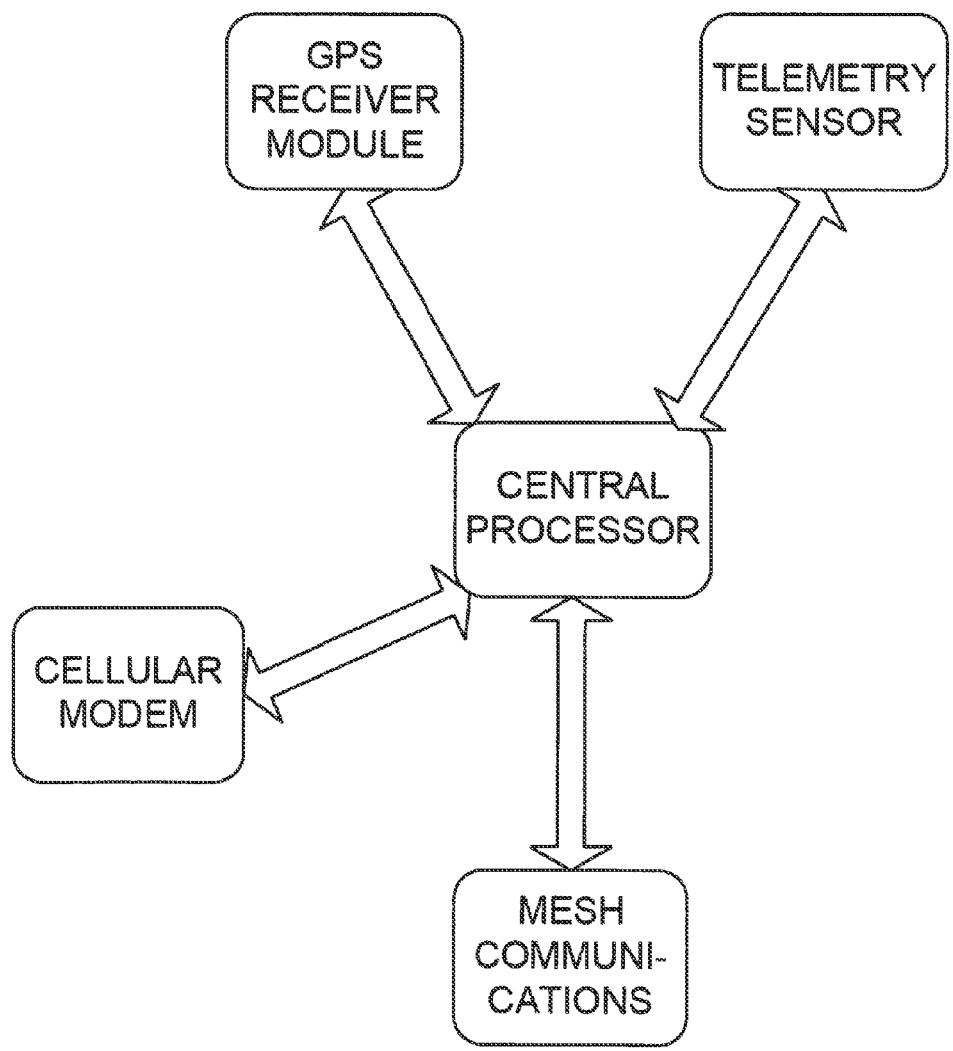

FIG. 3a-3b illustrate types of devices that can be dispersed throughout a MANet. The size difference among the devices shown in FIGS. 1, 3a, and 3b indicate that smaller devices may contain fewer communication mode options and can be used for different purposes as will be more fully described later. The devices may be grouped and deployed in such a manner as to create a mesh or MANet network like that described in the table above. The devices may be characterized respectively as core, gateway, and fringe devices.

Devices may receive from associated sensors data about the current environment of the device. Data may include location from global positioning system (GPS) receiver or various sensor information (e.g., temperature, humidity, shock, chemical parameters, presence of specific chemicals in the environment, radiation levels, etc.), or may include information input by human attendants, computers, or other systems having input access to a device. Devices can be associated with specific items (in a logistics system), personnel or units (in a personnel tracking system), but may also be stand-alone (as in a perimeter protection or intruder-alert system). Information may be cached for later transmission or streamed somewhat in real-time.

In a system implementation that includes a monitoring center, devices can be capable of two-way communication with the monitoring center, either directly or through a MANet or other type of network (possibly including multiple hierarchical network levels). Devices may have multiple modes/channels through which they may communicate, and devices monitor some or all of these modes/channels for instructions from the monitoring center or messages to relay to the monitoring center.

Devices may also relay messages from or to other devices, functioning as core or gateway nodes in the network. Devices may also change their roles in a network depending upon network status and/or other circumstances, and may have capabilities that they do not typically utilize but that are available when a role-change is effected. Devices may function as access points into the network (through input and output ports) for humans or other systems to send messages through the network. These messages may be unrelated to network or device state or environment.

Fringe devices or multiple hierarchical network levels are not necessarily required, but a typical implementation will benefit from the ability to include devices with minimal capabilities so as to minimize size, maximize battery life, enable concealment, reduce overall costs of manufacture, deployment, or operation, etc. Such fringe devices will typically generate situational data (location, sensor data, etc.) and communicate this information through the network to the monitoring center.

Relay devices are not necessarily required, but can benefit from the ability to leverage the greater power and longer-range communication capabilities of a few relay devices to allow fringe devices without such capabilities to have multiple options for communicating with a monitoring center or with other devices distant in the network.

Devices can also have capacity to store programs containing algorithms that allow the devices to autonomously determine communication actions based upon current environment and network status. Devices may be pre-programmed before being put into service and may be configured to accept re-programming from a monitoring center while in service. Programs may be complex and may have temporal components (requiring different decisions based upon time/date).

Actions that may depend upon decisions based on situational data and programmed algorithms include, but are not limited to, operational mode, alteration of reporting schedules, rejecting or accepting messages depending upon security protocols, encryption/decryption of messages, routing of relayed messages, choice of communication channels, choice of communication protocol (level of security, UDP packets v. TCP/IP v. SMS text messages, level of error correction, etc.), etc.

Devices may be associated into groups that should remain in communication or otherwise maintain association, and if one or more devices leave the association other devices or the monitoring center may be notified. While devices are in association, their environments may be sufficiently identical to allow sending situational data for only one representative device, saving both network bandwidth and (if relevant to the devices) battery life.

An additional area of intelligence can be a choice of role in a network. A device may apply situational data and programmed algorithms to change its role in the network (core, gateway, or fringe node, or different level in a multilevel hierarchical network, etc.), making this decision either alone or in concert with other devices in the network.

Specific physical characteristics of a device can include its power supply, embedded circuits, size, ability to accept data input or provide output, and an amount of memory. Specific device capabilities can include, but are not limited to, current location, modes of communication, ranges of communication, current state, including whether communication is established with other specific nodes, current algorithms for decision making, current network role, and possible network roles the device is capable of accepting. Some RF modes of communication that can be implemented into the device 10 include cellular protocols such as GSM and CDMA for voice communications, and HSPDA, GPRS, EV-DO, EDGE for data communications, satellite communication protocols, and WiFi/WiMax communication protocols. The various protocols can be utilized to send and receive data including voice, video, text and/or other data.

Devices (core, gateway, and/or fringe) in the network may include interfaces that allow humans to enter data or text messages and interfaces with attached or embedded sensors (temperature, humidity, shock, salinity, pH, contents volume, etc.). Devices may also have displays or data ports that allow humans or other systems access to the data and messages that is received or generated.

The network may further include intelligence at the device level in which each device is able to independently (without human or monitoring center intervention) follow prescribed logic to make decisions about when to send specific messages, through what mode or channel to send the messages, and to which other devices of the network to send the messages. These decisions may be based upon algorithms communicated to the device through messages originating from the monitoring center, as well as data the device receives about the status of the network, data about the device's location, data from sensors the device can communicate with, content of messages the device needs to communicate, and other situational factors about which the device has information. Intelligence may also allow devices to change their roles in the network (self-promoting from fringe to gateway node, for example).

As previously mentioned, devices may have attached or embedded sensors that measure environmental variables. Examples of environmental variables that sensors might monitor include temperature, humidity, shock, acidity or salinity (for sensors in water), presence of biological or chemical warfare agents in the atmosphere, fluid level in a tank. Devices may include the data from sensors in decision algorithms. For example, if an item must be stored within a specified temperature range, the device may be programmed to contact the monitoring center when the sensor detects a temperature approaching the boundary of the range, so that an attendant may be notified to alter the storage conditions. As another example, an infantryman's rifle might have a shock sensor that registers whether the rifle has experienced shock of the magnitude and direction that indicates one round has been fired. The fringe device attached to the sensor may then immediately notify a monitoring center that such an event has occurred, or may count rounds fired and when the total nears the total amount of ammunition the soldier was issued, if notifies the monitoring center which passes the information on to an automated re-supply system which initiates the process for delivering more ammunition to the soldier.

The network may also include intelligence at the monitoring center level that (without human intervention) informs specific devices in the network of preferred or prescribed paths through the network for sending messages. The monitoring center may base decisions about preferred or prescribed paths on its knowledge of locations of devices, capacities of devices, and current message loads for each device.

Devices may initiate messages that are intended for other devices in the network (as opposed to messages intended solely for the monitoring center). Such messages may include information about network traffic, devices with which the initiating device can directly communicate, battery or other internal device status, sensor information that may be used by other devices in their decision making (about what messages to communicate when), text messages entered by humans with access to the initiating device, or other messages (which may not be related to situational awareness) generated by humans or systems with input access to the initiating device.

The network may include as a communication link other, existing communications networks, such as the Internet, cell phone networks (and the complete world-wide telephone network), or a satellite phone network.

Devices can also be housed in a manner that matches its environment and its mission. This could mean enhanced weatherproofing for harsh outdoor climates, miniaturization for more covert missions, etc.

Monitoring Center

The monitoring center is a repository (typically a database) of information about the network, as gleaned from individual devices (and potentially from other sources), along with an interface that allows a user (human or another system that needs to monitor and/or control the network) to send instructions to devices (programming related to reporting schedules, setting priorities for communication channels, device operational modes, setting priorities for messages, etc.) and allows a user to receive information about the network, and possibly to receive messages sent through the network that are unrelated to network status. The monitoring center may be a computer system (computer, modems, Internet connectivity, software, data storage devices, etc.) or multiple computer systems, or it may be another data repository and interface system. The monitoring center may also include a call center manned by humans.

There may be multiple monitoring centers, all monitoring and controlling the same network. In this case, the devices are provided a protocol for resolving conflicting instructions from monitoring centers.

There may be multiple monitoring centers, each monitoring different parts of the network. In this case, there may be a super-monitoring center which monitors the entire network, or the multiple monitoring centers may be arranged in a hierarchy, or they may be peers. In any event, the network includes a protocol for resolving conflicting instructions from monitoring centers.

The monitoring center incorporates intelligence in that (without human intervention) it may instruct devices to use specific algorithms for deciding priorities among messages to transmit, among paths to send messages through the network, etc. based upon algorithms programmed into the monitoring center and upon information the center has received about the state of the network.

A user with access to the monitoring center may engage in two-way interaction with any device in the network. In one implementation using RF communication between devices, the monitoring center may be accessible through the World Wide Web, and so a user may be anywhere in the world. The devices comprising the web may also be anywhere in the world, not necessarily in proximity with (or on the same continent as) the monitoring center. The user may be a human communicating through a computer with a web browser, using a menu provided by the monitoring center to send instructions to devices, viewing maps and tables containing current responses from the devices. Real-time (or near real-time) responses from the devices allow the user to modify instructions in order to optimize the information received.

A second example of a user interacting with devices through a monitoring center is an automated re-supply system which uses the network to monitor use of supplies by geographically dispersed consumers. In this example, the monitoring center user is a computer system (hardware and software) that controls a supply chain. When the automated system detects that a consumer is running low on supplies, the system initiates a re-supply order.

A third example of a user interacting with devices through a monitoring center is a tactical command center on a battlefield. In this example application, some devices are carried as soldier beacons and some are attached to equipment, arms, munitions, etc. The tactical command center is able to monitor individual soldiers' locations, how much ammunition each soldier has, locations of vehicles, etc. through a monitoring center. There will be multiple tactical command centers in the theater of action, and a central monitoring center receives information from each so that the theater commander knows the status of all his forces. At the tactical command centers, users are able to direct the individual devices to report with specific information on specified schedules, to maintain silence (to avoid detection), etc. Command center users may use the network to issue orders through vehicle-mounted devices with interfaces to laptops, handheld computers, or to view-screens. Users of vehicle-mounted devices may use the network to communicate detailed information back to the command center.

Network

Some distinguishing characteristics are that the network comprises multiple node types (potentially arranged in a hierarchy) and that communication about network status is two-way.

In one embodiment, the network may include nodes with different communication capabilities and which function in different roles in the network. Nodes may have the capability to perform in multiple roles and may chose a role (or be assigned a role) based upon the current state of the device at the node and upon the state of the network (traffic in various parts of the network, fragments of the network out of communication due to movement or loss of one or more nodes, etc.) Specifically, priorities for assigning roles (or choosing roles) may be based upon combinations of Bandwidth
Range
Whether a node is also a monitoring center
Device capabilities
Cost of communication
Desired secrecy level for specific devices
Potential obstacles
Number of other nodes in range Remaining battery power
Situational factors
Likelihood of detection
Likelihood of interception
Probable or observed ambient noise
Probable or observed jamming
Probable or observed spoofing
Other factors (likelihood of devices getting blown up or captured, tactical factors, etc.)

Figure 4:
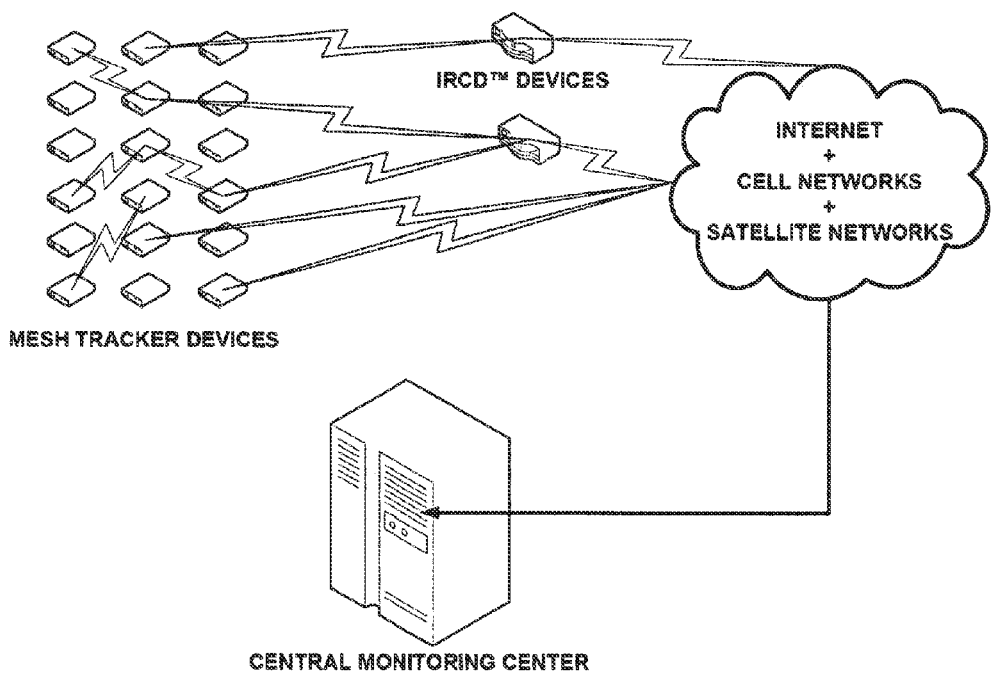
FIG. 4 is a network diagram illustrating a MANet comprised of a plurality of devices in which each device is communicable with a monitoring center via a variety of RF protocols.

An example implementation of roles in a network based on security is given in FIG. 4.

Nodes' roles may be reassigned by nodes themselves, by a monitoring center, or by consensus among a subset of nodes (particularly an associated group).

One example use of the hierarchy of nodes is to manage a large MANet. If there are thousands or hundreds of thousands of nodes, it will be useful to designate hierarchical layers of super-nodes, super-super-nodes, etc., which manage communication for sub-network layers under them. A super-node may store routing information for messages. Super-nodes may be dynamically designated to form high-traffic volume conduits ("superhighways") for moving messages between segments of the MANet or to and from the monitoring center. High-traffic volume may be attained through re-packaging messages in data-compressed bundles (or other recoding scheme) or through use of higher capacity channels (higher frequency RF or tapping into the Internet or using laser channels, for example).

Messages may be assigned priority based upon: Content, Age of message, Originating node, Message direction (up to monitoring center or down from monitoring center).

These priorities create a hierarchy among messages that defines which messages are relayed when and through what channels.

Among other differences the present network differs from other conceptual networks with situational awareness, including other geographic location network systems, in that communication is two-way, and the devices at the nodes exercise intelligence with regard to reporting situational status.

The monitoring center (or other command center) may request status updates or issue instructions to node devices related to changing status, and node devices may initiate communication with the monitoring center to report status (initiated because of device-intelligent decisions based upon programmed algorithms and current status, or because of human input to the device). In addition, node devices may initiate communication with other node devices (again because of device-intelligent decisions or human input).

The network may include delay-tolerance if devices have on-board cache for storing messages. The amount of tolerance may vary across the network, may change over time, and may be explicitly controlled by the monitoring center or may be left to evolve based upon other parameters in the network (including connections between nodes, traffic, amount of onboard cache, etc.).

Devices can typically have a choice of communication channels through which they may transmit messages. They may choose an appropriate channel dynamically, depending upon the algorithm programmed into the device by the monitoring center, message priority, and the current situation.

Figure 5:
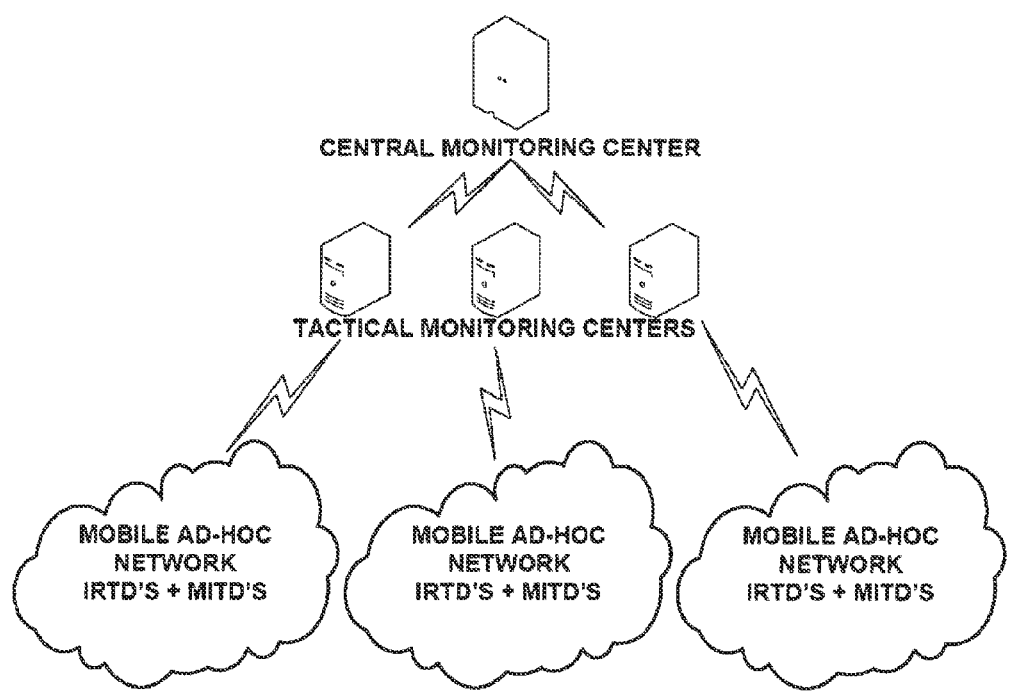
FIG. 5 is a network diagram illustrating a potential hierarchy of MANets and monitoring centers.

Many example implementations will use RF as a primary means of communication. In these implementations, each device will typically have capability to transmit and receive messages through multiple RF modes, including (i) cell phone modes (GSM modes, CDMA modes), (ii) satellite telephone modes (Iridium or other satellite telephone network), (iii) wifi, either going directly into and through the Internet or communicating directly to a computer or handheld wifi-enabled device, (iv) paging device frequencies, (v) short wave frequencies, (vi) unregulated frequencies, (vii) spread-spectrum frequency bands, (vii) any other frequency bands and communication protocols that enable specific combinations of communication goals (including power savings, distance of communication, reliability of communication, detection avoidance, communicating in challenging environments, etc). An example implementation of WiFi or possibly a device directly connected to a computer with internet access is depicted in FIG. 5.

Figure 6:
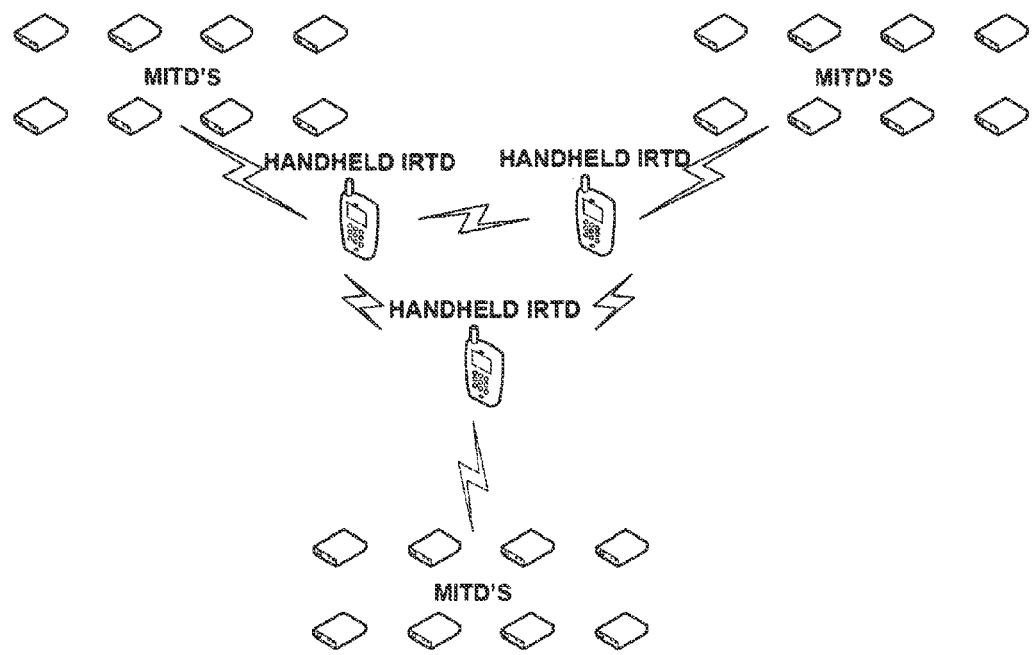
FIG. 6 is a network diagram illustrating a potential hierarchy of MANets and handheld devices that can be used in lieu of monitoring center(s).

Non-RF channels may also be implemented along with RF capabilities or in implementations that do not include RF communication. Examples include wired communication, fiber-optics, laser or infrared carriers, chemical or electrochemical signaling, quantum-entangled communication, or use of established communication networks (such as telephone networks, the Internet, etc.). An example implementation of quantum-entangled communication is depicted in FIG. 6.

FIGS. 3a-3b illustrate types of devices that can be dispersed throughout a MANet and used with the invention. In general a device will consist of a variety of RF and other capabilities, but typically a device will consist of at least one RF to support a MANet.

FIG. 4 is a network diagram illustrating a MANet comprised of a plurality of devices in which each device is communicable with a monitoring center via a variety of RF protocols. As shown here, a typical configuration will involve heterogeneous devices that according to the combination of RF they possess. IRCD™ devices route data to and from the Mesh Tracker devices. Some Mesh Tracker devices can also talk directly to the Monitoring Center. Mesh Tracker devices can be scattered anywhere around the world and form mobile networks.

FIG. 5 is a network diagram illustrating a potential hierarchy of MANets and monitoring centers. A central command center or other intelligent algorithm will ensure that each tactical monitoring center receives current information regarding all devices in a MANet, even though each tactical monitoring center only receives data from a subset of devices. The Central Monitoring Center ensures that all the Tactical Monitoring Centers have a complete picture of all the MANets even though they only directly interact with one of them. The Tactical Monitoring Centers funnel data from the Central Monitoring Center to the particular MANet and back. The Central Monitoring Center is where data is gather, analyzed, and sent along with device instructions back down to the Tactical Monitoring Centers.

FIG. 6 is a network diagram illustrating a potential hierarchy of MANets and handheld devices that can be used in lieu of monitoring center(s). Each handheld receives data from a subset or all devices in the MANet. In this illustration, the devices do not also report to a central monitoring center. No Monitoring Center available—each IRTD is a handheld computer and receives data from and sends instructions to its MITD's. The IRTD's also communicate so each is aware of the overall picture.

Provisional Number 2—Triple Mode Redundant Device

A device with TMR (Triple Mode Redundant) RF communications channels for use in transmitting remote location (GPS), sensor, or other telemetry data back to a monitoring station and/or relay station. The device is comprised of a GPS receiver capable of receiving GPS coordinates from geosynchronous satellites, a microprocessor for intelligently controlling the device, along with three or more separate RF transceivers for sending and receiving data between the device and a monitoring station or other devices. A monitoring station could consist of a Personal Computer or Laptop equipped with either RF reception equipment and connections to the Internet, or could consist of a large and complex monitoring center. A relay device could consist of another remote device with sufficient intelligence to relay information from one device to another.

The RF transceivers embodied in the device could be selected from a pool of devices, with the selection made on the basis of location, terrain, and distance to the monitoring station or other devices. One transceiver could be a preferred channel, while others could be used as back-ups or each channel could be sequentially used or changed based on time-of-day, altitude, or other parameters.

Three embodiments are described herein:

Embodiment "A" could include one transceiver in the 27 MHz range, another in the 400 MHz range, and a third in the 900 MHz range. The transmission/reception characteristics of the three frequency bands providing a robust communication path back to a monitoring station or relay device.

Embodiment "B" could include an GSM type cell phone transceiver, a CDMA type cell phone transceiver, and a third transceiver with protocols allowing for communication with other nearby devices.

Embodiment "C" could include a transceiver for communicating with a geosynchronous satellite network such as either the Iridium, inmarsat, or Globalstar networks, a cellular transceiver, either CDMA, GSM or a module embodying both, and an RF transceiver with with protocols allowing for communication with other nearby devices.

Embodiment "A" would transmit data through one or more standard RF transceivers in the remote device back to a monitoring station or relay device.

Embodiment "B" would be transmit data through one or more of the the cellular transceivers in the device to the cellular network and arrive at the monitoring station via various data protocols and communication paths provided by the cellular networks, or the data could be transmitted through a non-cellular RF transceiver either directly to the monitoring station or to other devices which would either relay the data until it reached the monitoring system or make use of their cellular transceivers to deliver the data to the monitoring station.

Embodiment "C" could transmit data either through the Satellite (Iridium or other) transceiver to the satellite network via various data protocols and communication paths provided by the satellite networks, or through the cellular transceiver/s in the device to the cellular network and arrive at the monitoring station via various data protocols and communication paths provided by the cellular networks, or the data could be transmitted through a non-cellular transceiver/non-satellite transceiver either directly to the monitoring station or to other devices which would either relay the data until it reached the monitoring system or make use of their cellular or satellite transceivers to deliver the data to the monitoring station.

Embodiments "A", "B" & "C" could be used in conjunction with one another such that the data could be relayed from device to device until a successful route could be found to the monitoring station. Further, transceiver techniques could be selected from any of the three embodiments to create other combinations.

Provisional Number 3—Flexible Communication Device for Animal Collars

A device for incorporating electronic components for a remote location and/or or other telemetry device into a flexible collar for a dog, cow, or other animal, where not all components are not candidates for mounting on a flexible substrate. The device utilizes one or more RF transceivers for use in transmitting remote location (GPS), sensor, or other telemetry data back to a monitoring station and/or relay station. The device is comprised of electronic components, some of which are of a size and package suited to mounting on a flexible substrate. Other electronic components are sufficiently large or require special metal shielding, making their mounting on a flexible substrate impractical. Described herein is a method for incorporating both types of components into packaging that would be compatible with a collar. The components or subsystems within the device are comprised of a GPS receiver capable of receiving GPS coordinates from geosynchronous satellites, a microprocessor for intelligently controlling the device, along with three or more separate RF transceivers for sending and receiving data between the device and a monitoring station or other devices, along with antennas or shared antenna for the GPS and RF transceivers. A monitoring station could consist of a Personal Computer or Laptop equipped with either RF reception equipment and connections to the Internet, or could consist of a large and complex monitoring center. A relay device could consist of another remote device with sufficient intelligence to relay information from one device to another.

Four embodiments, "A" through "D" are discussed herein:

Embodiment "A" is a configuration in which batteries, large modules, or components not suited for mounting on a flexible substrate are placed on a small, rigid circuit board. Attached to each end of this circuit board via common "flex circuit bonding techniques" are two additional circuits on flexible substrates such that there is a center "rigid" section, along with two flexible wings made up of the flexible circuitry.

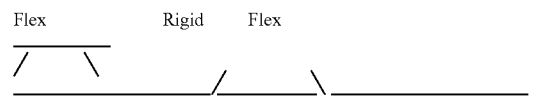

The rigid section is encapsulated in plastic or metal enclosure while the flex portions are covered with leather, nylon, or other materials commonly used in collars. Antenna wiring and components would be contained in the flexible portion. This design foresees the rigid portion of the device being iteratively reduced in size during sequential revisions as more components are reduced in size or otherwise changed to make them candidates for mounting on a flexible substrate. At one stage the only rigid portion would be that of the batteries, with all other components located on the flexible substrate.

Embodiment "B" is a configuration in which only large modules, or components not suited for mounting on a flexible substrate are placed on a small circuit board. Battery power would be supplied by batteries made of materials sufficiently flexible that they could be attached to the end of, underneath, or on top of one or more of the flexible substrates.

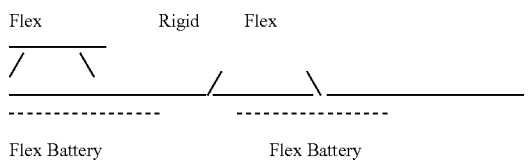

Embodiment "C" would have a makeup similar to embodiment "A", but with flexible circuitry on only one side.

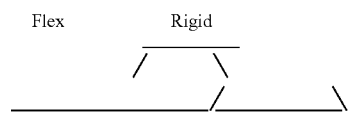

Embodiment "D" would have a makeup similar to embodiment "B", but with flexible circuitry on only one side.

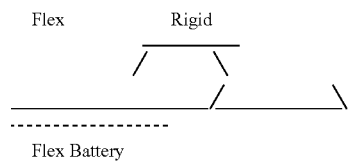

Provisional Number 4—Communication Device for Residential Telemetry

A device for use in transmitting sensor, or other telemetry data, such as "seal breakage" from pharma-packaging, or glucose readings from a glucometer, back to a monitoring station/server and/or relay station. The device is comprised of a microprocessor for intelligently controlling the device, along with one or more RF transceivers for sending and receiving data between the device and a monitoring station or other devices. A monitoring station could consist of a Personal Computer or Laptop equipped with either RF reception equipment and connections to the Internet, or could consist of a large and complex monitoring center. A relay device could consist of another remote device with sufficient intelligence to relay information from one device to another.

Two embodiments of this device are described herein:

Embodiment "A" of this device would include a transceiver capable of transmitting data to either a local monitoring center or a local relay device. Additionally each device would serve as a potential relay device for other devices. This ad hoc network would enable data from distant devices to reach the monitoring station through other devices in closer proximity to the monitoring station. As "seal breakage" from pharma-packaging, or other telemetry data is collected by a device, the data is transmitted over the wireless network and passed from device to device until it reaches the monitoring station where it could either be stored or uploaded to a remote server or centralized monitoring center.

Embodiment "B" of this device would include a cellular transmitter in the device capable of transmitting "seal breakage" from pharma-packaging, or other telemetry data to a remote server or centralized monitoring center. In this case the cellular service would be transparent to the user, requiring no external cell phone. The cell phone accounts could be provided to users as part of the central monitoring package.

Current literature and pending patents describe technology that is "used to collect information from a patient's home medical device through Bluetooth using a standard cell-phone, and then upload it to a centralized server." This current technology falls short for large institutional environments or customers without a cell phone or cell phone service. Embodiment "A" relates to the institutional environment and alleviates any need for cell service and the costs associated with it. Embodiment "A" is also effective for environments where no cellular service exists, but Internet service is available. Embodiment "B" is a solution for environments in which cellular service is available, but the user has no phone or lacks the ability to interact with one.

The invention claimed is:

1. A telecommunications system transmitting data across a network of nodes having device components enabling multiple modes of communications, the system comprising:
   core nodes in the network in communication with a network monitoring center;
   fringe nodes connected to the network;
   sensors connected to said fringe nodes and gathering telemetry data for the respective fringe nodes;
   gateway nodes connected to said fringe notes on the network and further connected to said core nodes across a backhaul;
   wherein at least said gateway nodes and core nodes comprise at least one digital signal processor and respective non-transitory computer readable storage media having programmed algorithms stored thereon that are executable by the processor in the gateway node or the core node;
   wherein said monitoring center receives said telemetry data across the backhaul and in response thereto, said monitoring center transmits hierarchical instructions to at least one node on the network;
   wherein upon receiving said instructions from the monitoring center, the at least one node receiving the instructions changes a network hierarchical status for the at least one node.

2. A telecommunications system according to claim 1, wherein said network hierarchical status comprises one of fringe node, gateway node, and core node.

3. A telecommunications system according to claim 1, wherein said instructions from the monitoring center comprise a command to said at least one node to change a communications channel on the network.

4. A telecommunications system according to claim 1, wherein said instructions from the monitoring center comprise a command to said at least one node to change a mode of RF communications on the network.

5. A telecommunications system according to claim 1, wherein said instructions comprise a message from said monitoring center and include said telemetry data.

6. A telecommunications system according to claim 1, wherein said instructions assign priorities for data communications to and from the at least one node receiving the instructions.

7. A telecommunications system according to claim 1, wherein said instructions assign delay tolerances for data communications to and from the at least one node receiving the instructions.

8. A telecommunications system comprising:
   a network monitoring center;
   at least one ad hoc network connected to the monitoring center across a backhaul on a network, said ad hoc network comprising network node devices in bi-directional communication across the ad hoc network;

wherein said monitoring center transmits command data to at least one of said network node devices to assign at least one communications channel to said at least one network node device;

wherein said at least one network node device comprises at least one digital signal processor and respective non-transitory computer readable storage media having programmed algorithms stored thereon that are executable by the processor to implement said command data; and wherein said channel assigns the at least one network node a role as a fringe node, a gateway node, or a core node in a hierarchy on the ad hoc network.

9. A telecommunications system comprising:

a network monitoring center;

at least one ad hoc network connected to the monitoring center across a backhaul on a network, said ad hoc network comprising network node devices in bi-directional communication across the ad hoc network;

wherein said monitoring center transmits command data to at least one of said network node devices to assign priorities among messages transmitted to and from said at least one network node device;

wherein said at least one network node device comprises at least one digital signal processor and respective non-transitory computer readable storage media having programmed algorithms stored thereon that are executable by the processor to implement said command data;

wherein said command data directs the at least one network node device to monitor channels for instructions from the monitoring center; and wherein at least one of the monitored channels assigns the at least one network node device a role as a fringe node, a gateway node, or a core node in a hierarchy on the ad hoc network.

* * * * *